(12) United States Patent
Hendry et al.

(10) Patent No.: US 11,729,384 B2
(45) Date of Patent: Aug. 15, 2023

(54) EXPLICIT ADDRESS SIGNALING IN VIDEO CODING

(71) Applicant: Huawei Technologies Co., Ltd., Shenzhen (CN)

(72) Inventors: FNU Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 17/362,279

(22) Filed: Jun. 29, 2021

(65) Prior Publication Data

US 2021/0329236 A1   Oct. 21, 2021

Related U.S. Application Data

(63) Continuation of application No. PCT/US2019/069052, filed on Dec. 31, 2019.

(60) Provisional application No. 62/883,537, filed on Aug. 6, 2019, provisional application No. 62/787,110, filed on Dec. 31, 2018.

(51) Int. Cl.
*H04N 19/119* (2014.01)
*H04N 19/174* (2014.01)
*H04N 19/184* (2014.01)
*H04N 19/46* (2014.01)

(52) U.S. Cl.
CPC ......... *H04N 19/119* (2014.11); *H04N 19/174* (2014.11); *H04N 19/184* (2014.11); *H04N 19/46* (2014.11)

(58) Field of Classification Search
CPC .. H04N 19/119; H04N 19/174; H04N 19/184; H04N 19/46
See application file for complete search history.

(56) References Cited

U.S. PATENT DOCUMENTS

| 11,336,890 B2* | 5/2022 | George | H04N 19/119 |
| 2013/0003868 A1* | 1/2013 | Sjoberg | H04N 19/119 375/E7.2 |

(Continued)

FOREIGN PATENT DOCUMENTS

| EP | 3293981 A1 | 3/2018 |
| WO | 2014050038 A1 | 4/2014 |

OTHER PUBLICATIONS

"Line Transmission of Non-Telephone Signals, Video Codec for Audiovisual Services at p × 64 kbits," ITU-T Recommendation H.261, Mar. 3, 1993, 29 pages.

(Continued)

*Primary Examiner* — Fabio S Lima
(74) *Attorney, Agent, or Firm* — Conley Rose, P.C.

(57) ABSTRACT

A video coding mechanism is disclosed. The mechanism includes receiving a sub-bitstream including: a sub-picture of a picture partitioned into a plurality of slices including a first slice, a parameter set associated with the picture and the sub-picture, and a slice header associated with the first slice. The parameter set is parsed to obtain an identifier and a length of a slice address of the first slice. A slice address for the first slice is determined from the slice header based on the identifier and the length of the slice address. The sub-bitstream is decoded to create a video sequence of sub-pictures including the first slice. The video sequence of sub-pictures is forwarded for display.

15 Claims, 11 Drawing Sheets

(56) References Cited

U.S. PATENT DOCUMENTS

| | | | |
|---|---|---|---|
| 2014/0086303 A1 | 3/2014 | Wang | |
| 2014/0093180 A1* | 4/2014 | Esenlik | H04N 19/597 382/233 |
| 2018/0084262 A1* | 3/2018 | Williams | H04N 19/98 |
| 2018/0084282 A1* | 3/2018 | Esenlik | H04N 19/597 |
| 2021/0127111 A1* | 4/2021 | George | H04N 19/172 |
| 2021/0235096 A1* | 7/2021 | Hendry | H04N 19/184 |
| 2021/0281868 A1* | 9/2021 | Deshpande | H04N 19/188 |
| 2021/0329236 A1* | 10/2021 | Hendry | H04N 19/167 |

OTHER PUBLICATIONS

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

Bross, et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, Document JVET-L1001v7, 226 pages.

Boyce, et al., "HEVC Additional Supplemental Enhancement Information (Draft 4)," Joint Collaborative Team on Video Coding (JCT_VC) of ITU-T SG 16 WP 3 and ISO/IEC JTC l/SC 29/WG 11, 29th Meeting: Macao, CN, Oct. 19-25, 2017, Document: JCTVC-AC1005-v2, 8 pages.

Document: JVET-L0686-v2, "Spec text for the agreed starting point on slicing and tiling," Joint Video Experts Team (JVET) of ITU-T SG 16 WP 3 and ISO/IEC JTC 1/SC 29/WG 11, 12th Meeting: Macao, CN, Oct. 3-12, 2018, 1 page.

Document: JVET-L0114-v1, "On slicing and tiling in VVC," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.

JCTVC-AB0028, Skupin, R., et al., "MCTS extraction with optional slice reordering", Joint Collaborative Team on Video Coding (JCT-VC) of ITU-T SG 16 WP 3 and ISO/IEC JTC 1/SC 29/WG 11, 28th Meeting: Torino, IT, Jul. 15-21, 2017, 4 pages.

JCTVC-AC0033, Oh, H-M, et al., "MCTS extraction with implicit slice reordering", Joint Collaborative Team on Video Coding (JCT-VC) of ITU-T SG 16 WP 3 and ISO/IEC JTC 1/SC 29/WG 11,29th Meeting: Macao, CN, Oct. 19-25, 2017, 3 pages.

JVET-P0609-v2, Sjoberg, R., et al., "AHG12: On slice address signaling", Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

JCTVC-I0118, Zhou, M., et al., "AHG4: Enable parallel decoding with tiles", Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, 9 pages.

Document: JVET-K1001-v5, Bross, B., et al, "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 136 pages.

Document: JCTVC-Z0037, Deshpande, S., et al., "On Motion-Constrained Tile Sets Extraction Information Set SEI," Joint Collaborative Team on Video Coding (JCT-VC) of ITU-T SG 16 WP 3 and ISO/IEC JTC 1/SC 29/WG 11 26th Meeting: Geneva, CH, Jan. 12-20, 2017, 7 pages.

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 45 pages.

* cited by examiner

EXPLICIT ADDRESS SIGNALING IN VIDEO CODING

CROSS-REFERENCE TO RELATED APPLICATIONS

This patent application is a continuation of International Application No. PCT/US2019/069052, filed Dec. 31, 2019 by FNU Hendry, et. al., and titled "Explicit Address Signaling In Video Coding," which claims the benefit of U.S. Provisional Patent Application No. 62/787,110, filed Dec. 31, 2018 by FNU Hendry, et. al., and titled "Explicit Tile Identifier (ID) Signaling," and U.S. Provisional Patent Application No. 62/883,537, filed Aug. 6, 2019 by FNU Hendry, et. al., and titled "Explicit Tile Identifier (ID) Signaling," which are hereby incorporated by reference.

TECHNICAL FIELD

The present disclosure is generally related to video coding, and is specifically related to address management when extracting sub-pictures from pictures in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a sub-bitstream including: a sub-picture of a picture partitioned into a plurality of slices including a first slice, a parameter set associated with the picture and the sub-picture, and a slice header associated with the first slice; parsing, by a processor of the decoder, the parameter set to obtain an identifier and a length of a slice address of the first slice; determining, by the processor, the slice address for the first slice from the slice header based on the identifier and the length of the slice address; decoding, by the processor, the sub-bitstream to create a video sequence of sub-pictures including the first slice; and forwarding, by the processor, the video sequence of sub-pictures for display. In some video coding systems, slices (also known as tile groups) may be addressed based on a set of indices. Such indices may start at index zero at the top left corner of a picture and increase in raster scan order ending at an index N at the bottom right corner of the picture, where N is the number of indices minus one. Such systems work well for most applications. However, certain applications, such as virtual reality (VR), only render a sub-picture of a picture. Some systems may increase coding efficiency when streaming VR content by only transmitting a sub-bitstream of the bitstream to the decoder, where the sub-bitstream contains the sub-picture to be rendered. In such a case, an index based addressing scheme may cease to operate correctly because the top left corner of the sub-picture, as received by the decoder, is generally some index other than zero. To address such concerns, the encoder (or an associated slicer) may be required to re-write each slice header to change the indices of the sub-picture so that the top left index starts at zero and the remaining sub-picture slices are adjusted accordingly. Dynamically rewriting slice headers (e.g., for each user request) may be highly processor intensive. The disclosed system employs an addressing scheme that allows for extracting a sub-bitstream containing sub-pictures without requiring that the slice headers be rewritten. Each slice is addressed based on an identifier (ID) other than the index (e.g., a sub-picture ID). In this way, the decoder can consistently determine all relevant addresses regardless of which sub-picture is received and regardless of the received sub-picture's position relative to the top left corner of the complete picture. As the ID is arbitrarily defined (e.g., selected by the encoder), the ID is encoded in a variable length field. Accordingly, a length of the slice address is also signaled. An ID associated with the sub-picture is signaled as well. The length is employed to interpret the slice address, and the sub-picture ID is employed to map the slice address from a picture based position to a sub-picture based position. By employing these mechanisms, the encoder, the decoder, and/or a related slice can be improved. For example, a sub-bitstream can be extracted and transmitted instead of the entire bitstream, which reduces the usage of network resources, memory resources, and/or processing resources. Further, such sub-bitstream extraction can be performed without rewriting each slice header for each user request, which further reduces the usage of network resources, memory resources, and/or processing resources.

Optionally, in any of the preceding aspects, another implementation of the aspect provides, wherein the identifier is associated with a sub-picture.

Optionally, in any of the preceding aspects, another implementation of the aspect provides, wherein the length of the slice address indicates a number of bits contained in the slice address.

Optionally, in any of the preceding aspects, another implementation of the aspect provides, wherein determining the slice address for the first slice comprises: employing, by the processor, the length from the parameter set to determine bit boundaries for interpreting the slice address from the slice header; and employing, by the processor, the identifier and the slice address to map the slice address from a picture based position to a sub-picture based position.

Optionally, in any of the preceding aspects, another implementation of the aspect provides, further comprising parsing, by the processor, a parameter set to obtain an identifier (ID) flag, wherein the ID flag indicates a mapping is available to map the slice address from the picture based position to the sub-picture based position.

Optionally, in any of the preceding aspects, another implementation of the aspect provides, wherein the mapping between the picture based position and the sub-picture based position aligns the slice header to the sub-picture without requiring that the slice header be rewritten.

Optionally, in any of the preceding aspects, another implementation of the aspect provides, wherein the slice address comprises a defined value and does not comprise an index.

In an embodiment, the disclosure includes a method implemented in an encoder, the method comprising: encoding, by a processor of the encoder, a picture in a bitstream, wherein the picture comprises a plurality of slices including a first slice; encoding in the bitstream, by the processor, a slice header including a slice address of the first slice; encoding in the bitstream, by the processor, a parameter set including an identifier and a length of a slice address of the first slice; extracting, by the processor, a sub-bitstream of the bitstream by extracting the first slice based on the slice address of the first slice, the length of the slice address, and the identifier without rewriting the slice header; and storing, in a memory of the encoder, the sub-bitstream for communication toward a decoder. In some video coding systems, slices (also known as tile groups) may be addressed based on a set of indices. Such indices may start at index zero at the top left corner of a picture and increase in raster scan order ending at an index N at the bottom right corner of the picture, where N is the number of indices minus one. Such a system works well for most applications. However, certain applications, such as virtual reality (VR), only render a sub-picture of a picture. Some systems may increase coding efficiency when streaming VR content by only transmitting a sub-bitstream of the bitstream to the decoder, where the sub-bitstream contains the sub-picture to be rendered. In such a case, an index based addressing scheme may cease to operate correctly because the top left corner of the sub-picture, as received by the decoder, is generally some index other than zero. To address such concerns, the encoder (or an associated slicer) may be required to re-write each slice header to change the indices of the sub-picture so that the top left index starts at zero and the remaining sub-picture slices are adjusted accordingly. Dynamically rewriting slice headers (e.g., for each user request) may be highly processor intensive. The disclosed system employs an addressing scheme that allows for extracting a sub-bitstream containing sub-pictures without requiring that the slice headers be rewritten. Each slice is addressed based on an identifier (ID) other than the index (e.g., a sub-picture ID). In this way, the decoder can consistently determine all relevant addresses regardless of which sub-picture is received and regardless of the received sub-picture's position relative to the top left corner of the complete picture. As the ID is arbitrarily defined (e.g., selected by the encoder), the ID is encoded in a variable length field. Accordingly, a length of the slice address is also signaled. An ID associated with the sub-picture is signaled as well. The length is employed to interpret the slice address, and the sub-picture ID is employed to map the slice address from a picture based position to a sub-picture based position. By employing these mechanisms, the encoder, the decoder, and/or a related slice can be improved. For example, a sub-bitstream can be extracted and transmitted instead of the entire bitstream, which reduces the usage of network resources, memory resources, and/or processing resources. Further, such sub-bitstream extraction can be performed without rewriting each slice header for each user request, which further reduces the usage of network resources, memory resources, and/or processing resources.

Optionally, in any of the preceding aspects, another implementation of the aspect provides, wherein the identifier is associated with a sub-picture.

Optionally, in any of the preceding aspects, another implementation of the aspect provides, wherein the length of the slice address indicates a number of bits contained in the slice address.

Optionally, in any of the preceding aspects, another implementation of the aspect provides, wherein the length in the parameter set contains data sufficient to interpret the slice address from the slice header, and wherein the identifier contains data sufficient to map the slice address from a picture based position to a sub-picture based position.

Optionally, in any of the preceding aspects, another implementation of the aspect provides, further comprising encoding in a parameter set, by the processor, an identifier (ID) flag indicating a mapping is available to map the slice address from the picture based position to the sub-picture based position.

Optionally, in any of the preceding aspects, another implementation of the aspect provides, wherein the slice address comprises a defined value and does not comprise an index.

Optionally, in any of the preceding aspects, another implementation of the aspect provides, wherein extracting the sub-bitstream of the bitstream includes extracting a sub-picture of the picture, the sub-picture including the first slice, and wherein the sub-bitstream comprises the sub-picture, the slice header, and the parameter set.

In an embodiment, the disclosure includes a video coding device comprising: a processor, a memory, a receiver coupled to the processor, and a transmitter coupled to the processor, the processor, memory, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a video coding device comprising: a receiving means for receiving a sub-bitstream including: a sub-picture of a picture partitioned into a plurality of slices including a first slice, a parameter set associated with the picture and the sub-picture, and a slice header associated with the first slice; a parsing means for parsing the parameter set to obtain an identifier and a length of a slice address of the first slice; a determining means for determining the slice address for the first slice from the slice header based on the identifier and the length of the slice address; a decoding means for decoding the sub-bitstream to create a video sequence of sub-pictures including the first slice; and a forwarding means for forwarding the video sequence of sub-pictures for display.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding a picture in a bitstream, wherein the picture comprises a plurality of slices including a first slice; encoding in the bitstream a slice header including a slice address of the first slice; and encoding in the bitstream a parameter set including an identifier and a length of a slice address of the first slice; an extracting means for extracting a sub-bitstream of the bitstream by extracting the first slice based on the slice address of the first slice, the length of the slice address, and the identifier without rewriting the slice header; and a storing means for storing the sub-bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
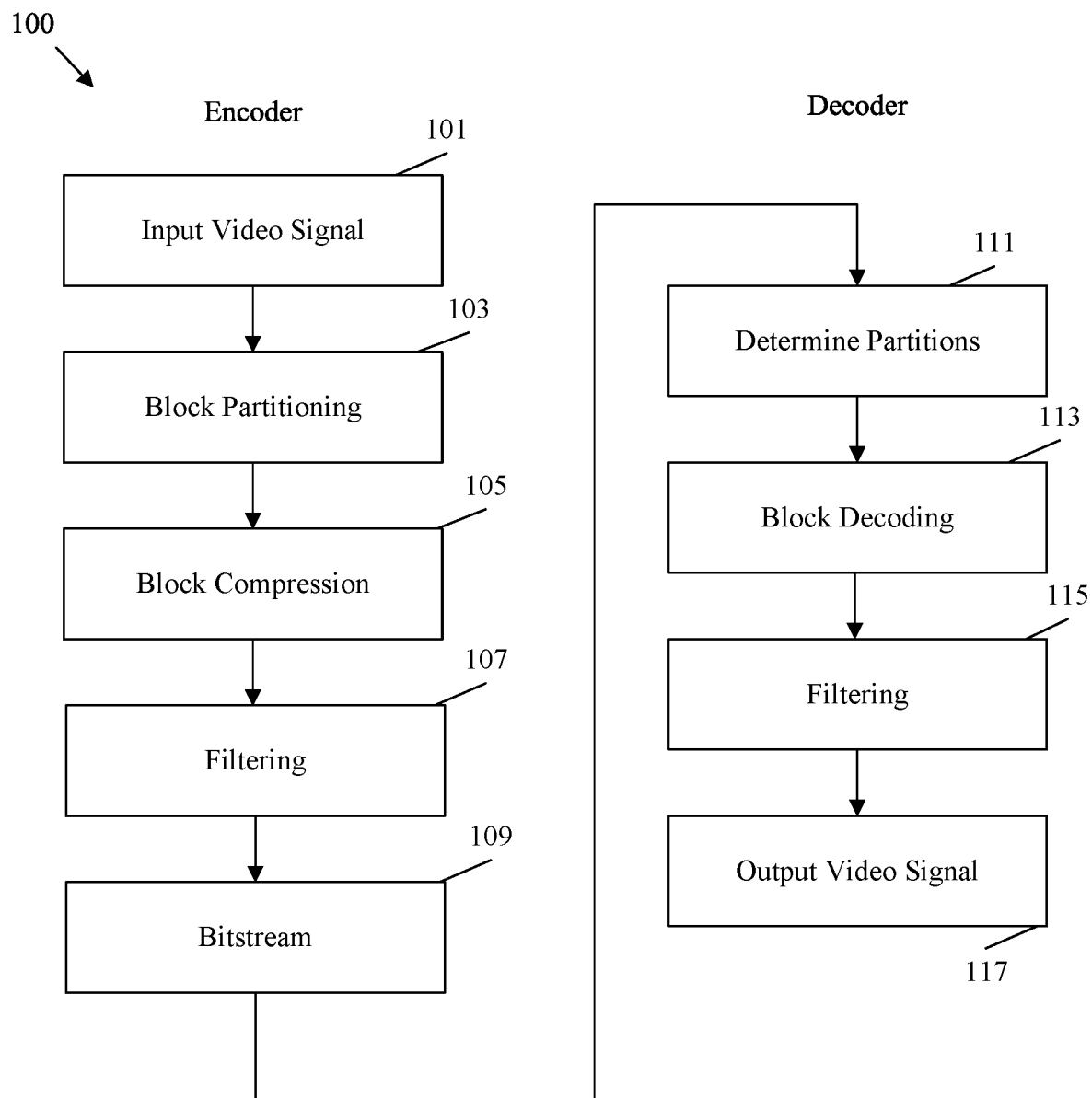
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various acronyms are employed herein, such as coding tree block (CTB), coding tree unit (CTU), coding unit (CU), coded video sequence (CVS), Joint Video Experts Team (JVET), motion constrained tile set (MCTS), maximum transfer unit (MTU), network abstraction layer (NAL), picture order count (POC), raw byte sequence payload (RBSP), sequence parameter set (SPS), versatile video coding (VVC), and working draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v7.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for an MCTS set. The information includes a number of extraction information sets, each defining a number of MCTS sets and containing raw bytes sequence payload (RBSP) bytes of the replacement video parameter set (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

The preceding scheme may include certain problems. In some systems, when there is more than one tile/slice in a picture, the address of the tile group may be signaled as an index in a tile group header by using a syntax element, such as tile_group_address. A tile_group_address specifies the tile address of the first tile in the tile group. The length of tile_group_address may be determined as Ceil(Log 2 (NumTilesInPic)) bits, where NumTilesInPic includes the number of tiles in the picture. The value of tile_group_address may be in the range of zero to NumTilesInPic−1, inclusive, and the value of tile_group_address may not be equal to the value of tile_group_address of any other coded tile group NAL unit of the same coded picture. The tile_group_address may be inferred to be zero when not present in the bitstream.

The tile address described above includes a tile index. However, using tile index as the address for each tile group may result in certain coding inefficiencies.

For example, certain use cases may require modification of an AVC or HEVC slice segment header between encoding and decoding, either on the client-side directly before passing the bitstream to the decoder, or in some network-based media processing entity. One example of such a use case is tiled streaming. In tile streaming, a panoramic video is encoded using HEVC tiles, but the decoder only decodes a portion of these tiles. By rewriting the HEVC slice segment header (SSH) as well as the SPS/PPS, the bitstream can be manipulated in order to change the subset of tiles being decoded as well as their spatial arrangement in the decoded video frame. One reason for this CPU processing cost is the fact that AVC and HEVC slice segment headers use variable length fields and have a byte alignment field at the end. This means that whenever a certain field in the SSH is changed, this may have an impact on the byte alignment field at the end of the SSH, which is then also rewritten. And because all fields are variable length encoded, the only way to know the location of the byte alignment field is to parse all preceding fields. This results in significant processing overhead, especially when tiles are used and a second's worth of video may contain hundreds of NALs. Some systems support signaling a tile identifier (ID) explicitly. However, some syntax elements may not be optimized and may include unnecessary and/or redundant bits when signaling. Furthermore, some constraints of associated with explicit tile ID signaling are not specified.

For example, the preceding mechanisms allow pictures to be partitioned and compressed. For example, a picture can be partitioned into slices, tiles, and/or tile groups. In some examples, a tile group may be used interchangeably with a slice. Such slice and/or tile groups may be addressed based on a set of indices. Such indices may start at index zero at the top left corner of a picture and increase in raster scan order ending at an index N at the bottom right corner of the picture. In this case, N is the number of indices minus one. Such a system works well for most applications. However, certain applications, such as virtual reality (VR), only render a sub-picture of a picture. Such a sub-picture may be referred to as a region of interest in some contexts. Some systems may increase coding efficiency when streaming VR content by only transmitting a sub-bitstream of the bitstream to the decoder, where the sub-bitstream contains the sub-picture to be rendered. In such a case, an index based addressing scheme may cease to operate correctly because the top left corner of the sub-picture, as received by the decoder, is generally some index other than zero. To address such concerns, the encoder (or an associated slicer) may be required to re-write each slice header to change the indices of the sub-picture so that the top left index starts at zero and the remaining sub-picture slices are adjusted accordingly. Dynamically rewriting slice headers (e.g., for each user request) may be highly processor intensive.

Disclosed herein are various mechanisms to increase the coding efficiency and reduce processing overhead when extracting sub-bitstreams including sub-pictures from encoded bitstreams including pictures. The disclosed system employs an addressing scheme that allows for extracting a sub-bitstream containing sub-pictures without requiring that the slice headers be rewritten. Each slice/tile group is addressed based on an ID other than an index. For example, a slice can be addressed by a value that can be mapped to an index and stored in the slice header. This allows a decoder to read the slice address from the slice header and map the address from a picture based position to a sub-picture based position. As the slice address is not a predefined index, the slice address is encoded in a variable length field. Accordingly, a length of the slice address is also signaled. An ID associated with the sub-picture is signaled as well. The sub-picture ID and the length may be signaled in a PPS. A flag may also be signaled in the PPS to indicate an explicit addressing scheme is employed. Upon reading the flag, the decoder can obtain the length and the sub-picture ID. The length is employed to interpret the slice address from the slice header. The sub-picture ID is employed to map the slice address from the picture based position to the sub-picture based position. In this way, the decoder can consistently determine all relevant addresses regardless of which sub-picture is received and regardless of the received sub-pictures position relative to the top left corner of the complete picture. Further, this mechanisms allows such determinations to be made without rewriting the slice header to change slice address values and/or without changing byte alignment fields associated with the slice addresses. By employing the mechanisms described above, the encoder, decoder, and/or a related slice can be improved. For example, a sub-bitstream can be extracted and transmitted instead of the entire bitstream, which reduces the usage of network resources, memory resources, and/or processing resources. Further, such sub-bitstream extraction can be performed without rewriting each slice header for each user request, which further reduces the usage of network resources, memory resources, and/or processing resources.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
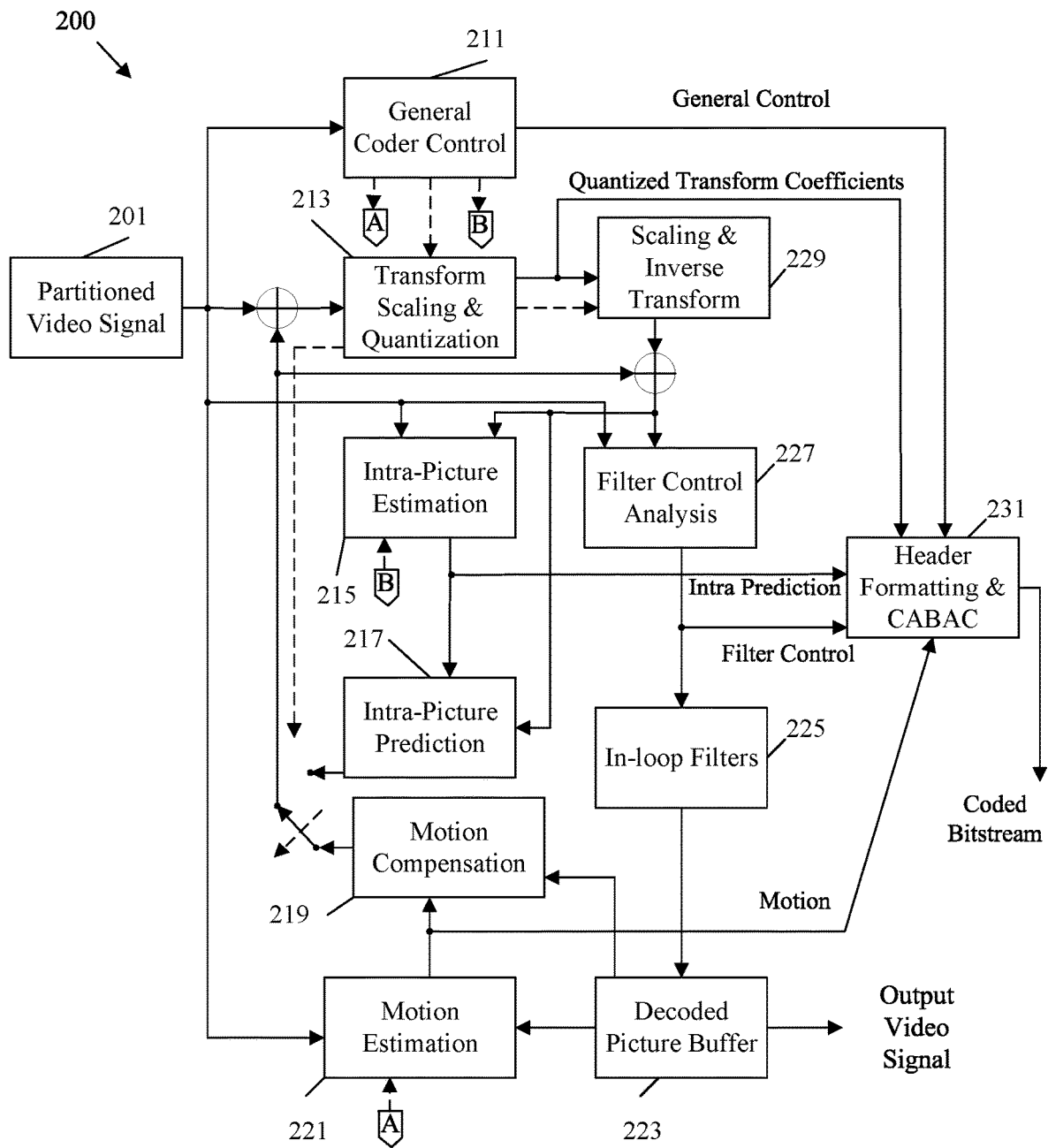
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original uncoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
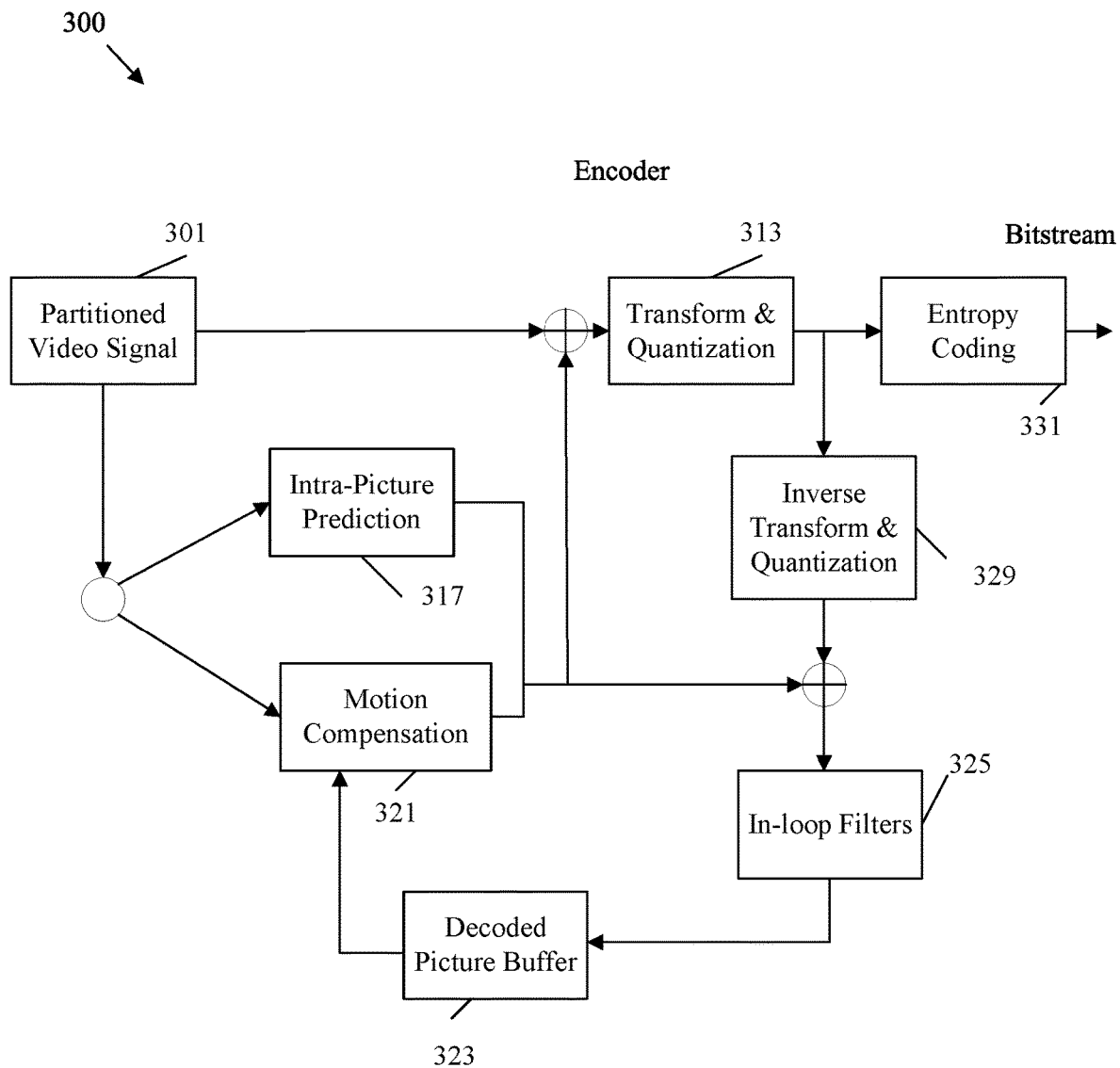
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323.

The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
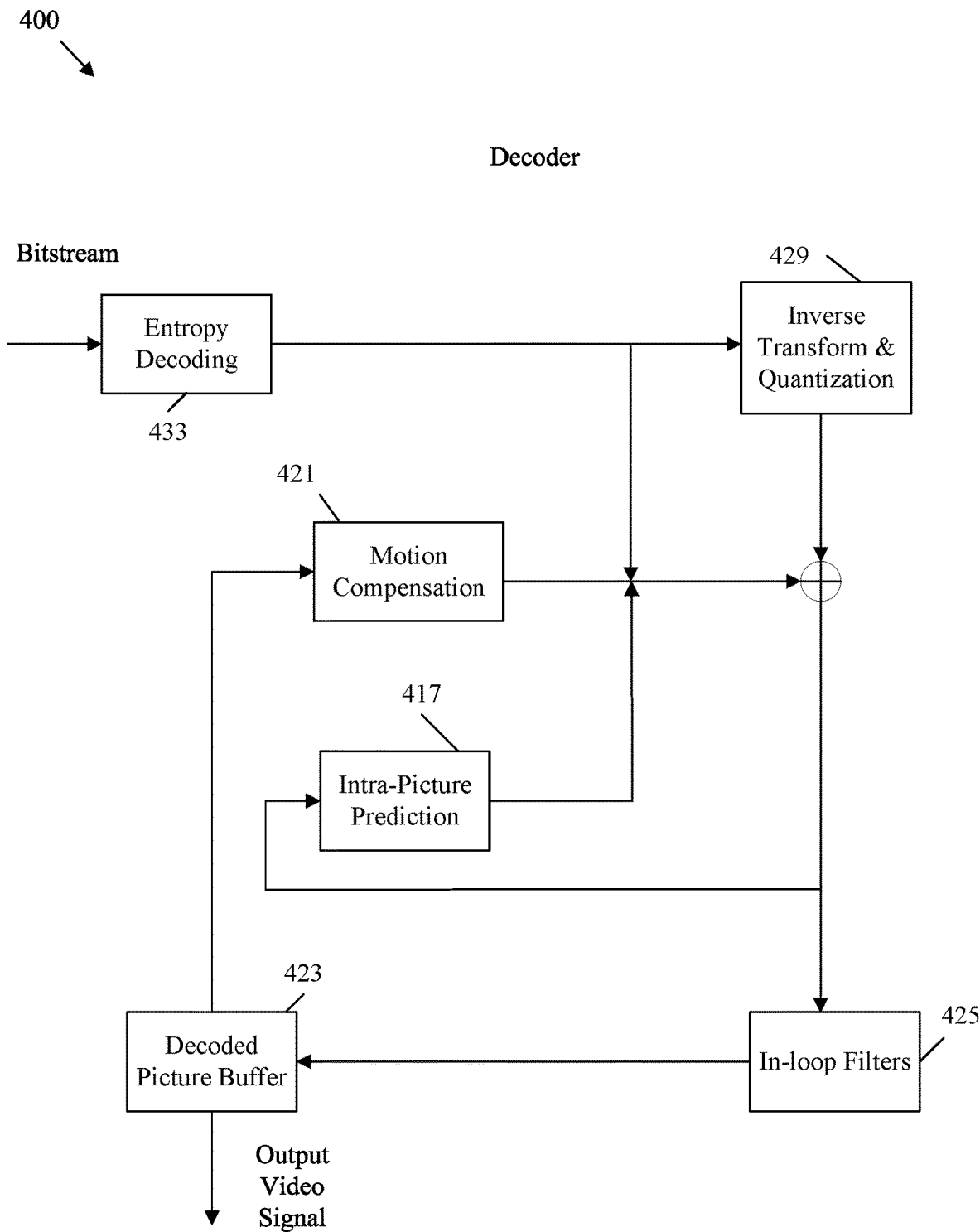
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217.

Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
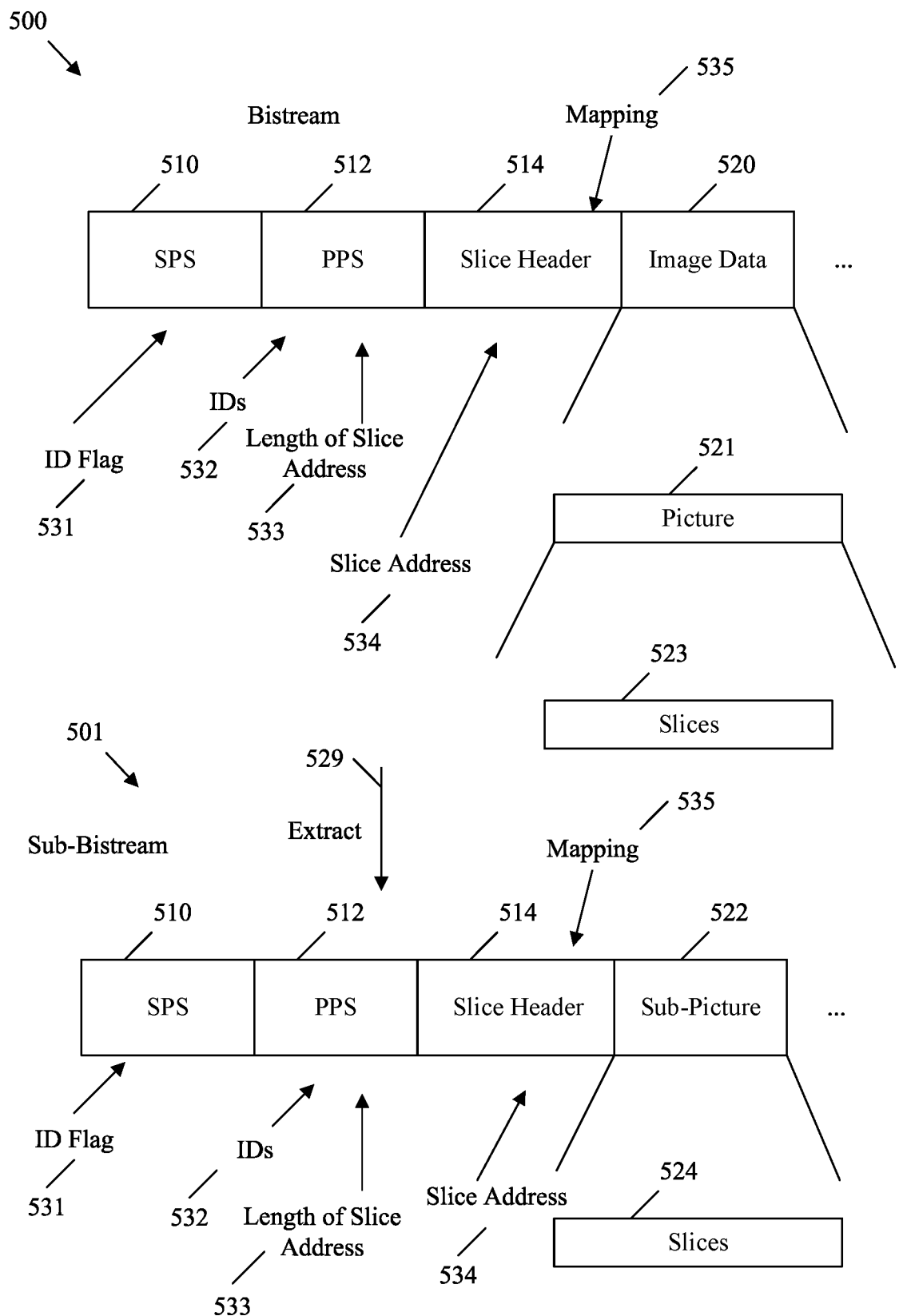
FIG. 5 is a schematic diagram illustrating an example sub-bitstream extracted from a bitstream.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, a plurality of slice headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The slice header 514 contains parameters that are specific to one or more corresponding slices in a picture. Hence, each slice in the video sequence may refer to a slice header 514. The slice header 514 may contain slice type information, picture order counts (POCs), reference picture lists, prediction weights, tile entry points, deblocking parameters, etc. In some examples, slices may be referred to as tile groups. In such a case, the slice header 514 may be referred to as a tile group header.

The image data 520 contains video data encoded according to inter-prediction and/or intra-prediction as well as corresponding transformed and quantized residual data. Such image data 520 is sorted according to a partitioning used to partition the image prior to encoding. For example, the video sequence is divided into pictures 521. The pictures 521 are divided into slices 523. The slices 523 may be further divided into tiles and/or CTUs. The CTUs are further divided into coding blocks based on coding trees. The coding blocks can then be encoded/decoded according to prediction mechanisms. For example, a picture 521 can contain one or more slices 523. The picture 521 refers to the PPS 512, and the slices 523 refer to the slice header 514. Each slice 523 may contain one or more tiles. Each slice 523 and/or picture 521 can then contain a plurality of CTUs.

Each picture 521 may contain an entire set of visual data associated with a video sequence for a corresponding instant in time. A VR system may display a user selected region of the picture 521, which creates the sensation of being present in the scene depicted in the picture 521. The region a user may wish to view is not known when the bitstream 500 is encoded. Accordingly, the picture 521 may contain each possible region a user may potentially view. However, in the VR context, the corresponding codec may be designed based on the presumption that the user only views a selected region of the picture 521 and the remaining portions of the picture 521 are discarded.

Each slice 523 may be a rectangle defined by a CTU at an upper left corner and a CTU at a bottom right corner. In some examples, a slice 523 includes a series of tiles and/or CTUs in a raster scan order proceeding from left to right and top to bottom. In other examples, a slice 523 is a rectangular slice. A rectangular slice may not traverse the entire width of a picture according to a raster scan order. Instead, a rectangular slice may contain a rectangular and/or square region of the picture 521 defined in terms of a CTU and/or tile rows and a CTU and/or tile columns. A slice 523 is the smallest unit that can be separately displayed by a decoder. Hence, slices 523 from a picture 521 may assigned to different sub-pictures 522 to separately depict desired regions of a picture 521. For example, in aVR context, a picture 521 may contain an entire viewable sphere of data, but a user may only view a sub-picture 522 containing one or more slices 523 on a head mounted display.

As noted above, the video codec may assume that non-selected regions of the picture 521 are to be discarded at the decoder. Accordingly, a sub-bitstream 501 may be extracted from the bitstream 500. The extracted sub-bitstream 501 may contain selected sub-picture(s) 522 and associated syntax. Non-selected regions of the picture 521 may be transmitted at a lower resolution or omitted to increase coding efficiency. A sub-picture 522 is a selected region of a picture 521 and may contain one or more associated slices 524. Slices 524 are a sub-set of the slices 523 that depict a selected region of the picture 521 associated with the sub-picture 522. The sub-bitstream 501 also contains the SPS 510, PPS 512, slice headers 514, and/or sub-portions thereof that are relevant to sub-picture 522 and slices 524.

The sub-bitstream 501 can be extracted from the bitstream 500. For example, a user employing a decoder may view a segment of video. The user may select a corresponding region of the pictures 521. The decoder can request subsequent sub-pictures 522 associated with the region the user is currently viewing. The encoder can then forward sub-pictures 522 associated with the selected region at a higher resolution and the remaining regions of the picture 521 at lower resolutions. To allow such functionality, the decoder can extract 529 one or more sub-bitstreams 501 from the bitstream 500. Extraction 529 includes placing the sub-pictures 522, including slices 524 in the sub-picture 522, into the sub-bitstream 501. Extraction 529 also includes placing the relevant SPS 510, PPS 512, and slice headers 514 into the sub-bitstream as desired to support decoding the sub-pictures 522 and slices 524.

One issue with sub-bitstream 501 extraction 529 is that addressing relative to the picture 521 may differ from addressing relative to the sub-picture 522. The addressing issue is discussed in greater detail below. In some systems, the slice header 514 can be rewritten to adjust for such addressing discrepancies. However, the sub-bitstream 501 may contain many slice headers 514 (e.g., on the order of one or two per picture 521), and such slice headers 514 are rewritten dynamically for each user. As such, rewriting slice headers 514 in this manner may be very processor intensive. The present disclosure includes mechanisms that allow the slice headers 514 to be extracted 529 into the sub-bitstream 501 without rewriting the slice headers 514.

In systems that rewrite slice headers 514, the slices 523 and 524 are addressed based on index values, such as slice index, tile index, CTU index, etc. Such indices increase in value in raster scan order. To correct for addressing mismatches, the disclosed embodiments employ defined ID values for each slice, tile, and/or CTU. Such defined IDs may be default values and/or may be selected by the encoder. The defined IDs may increase in raster scan order in a consistent manner, however such defined IDs may not be monotonically increasing. Accordingly, the defined IDs may leave gaps between values to allow for address management. For example, indices may monotonically increase (e.g., zero, one, two, three, etc.) while defined IDs may increase by some defined multiple (e.g., zero, ten, twenty, thirty, etc.) The encoder can include a mapping 535 in the bitstream 500 and sub-bistream 501, which allows the decoder to map from the defined IDs to indices that the decoder can interpret.

A parameter set, such as the SPS 510 and/or PPS 512, may include an ID flag 531. The ID flag 531 may be set to indicate that a mapping 535 is available to map the slice address from the picture 521 based position to the sub-picture 522 based position. Accordingly, the ID flag 531 may be set to indicate to the decoder the disclosed mechanisms being employed in the bitstream 500 and sub-bitstream 501. For example, the ID flag 531 may be coded as an explicit tile ID flag, a sps_subpic_id_present_flag, or other syntax element. The ID flag 531 may be encoded into the bitstream 500 and extracted 529 into the sub-bitstream 501.

A parameter set, such as the SPS 510 and/or PPS 512, may also include an ID 532 syntax element. The IDs 532 may indicate the sub-pictures 522 in the picture 521. For example, an array of IDs 532 can be included in the bitstream 500 PPS 512. When the sub-bitstream 501 is extracted 529, the ID(s) 532 associated with the sub-picture (s) 522 to be sent to the decoder can be included in the sub-bitstream 501 PPS 512. In other examples, a point to the relevant ID(s) 532 can be inserted into the PPS 512 in the sub-bitstream 501 to allow the decoder to determine the correct the ID(s) 532. For example, a ID 532 may be coded as a SubPicIdx, a Tile_id_val[i], or other syntax element that indicates the boundaries of the sub-picture 522.

A parameter set, such as the SPS 510 and/or PPS 512, may also include a length of slice address 533 syntax element. In addition, the slice header 514 may include the slice addresses 534 for the slices 523. The slice addresses 534 are included as defined ID values. The slice addresses 534 can be directly extracted 529 into the slice header 514 in the sub-bitstream 501 without modification to avoid rewriting the slice header 514. For example, a slice address 534 may be coded as a slice_address, a tile_group_address, or other syntax element that indicates boundaries of the slices 523 and 524. The length of slice address 533 can then be employed to interpret the slice addresses 534. For example, the slice addresses 534 include encoder defined values, and are hence coded as variable length values followed by byte alignment fields. The length of slice address 533 may indicate a number of bits contained in a corresponding slice address 534, and may hence indicate to the decoder the boundaries of the slice address 534. As such, the decoder can employ the length of slice address 533 (e.g., from the PPS 512) to interpret the slice addresses 534. As such, the slice header 514 need not be rewritten to adjust the byte alignment fields following the slice addresses 534. For example, a length of slice address 533 may be coded as a subpic_id_len_minus1, a tile_id_len_minus1, or other syntax element that indicates the length of the slice address 533. The length of slice address 533 may be included in the PPS 512 of the bitstream 500 and then extracted 529 into the PPS 512 of the sub-bitstream 501.

A mapping 535 may also be transmitted in a parameter set, such as the SPS 510, PPS 512, and/or slice header 514. The mapping 535 indicates a mechanism to map the slice addresses from a picture 521 based position to a sub-picture 522 based position. The mapping 535 may be encoded into the bitstream 500 and extracted 529 into a corresponding parameter set in the sub-bitstream 501. For example, mapping 535 may be coded as a SliceSubpicToPicIdx [SubPicIdx] [slice_address] syntax element, a tileIdToIdx [Tile_group_address] syntax element, or other syntax element that indicates a mechanism to map the slice addresses from a picture 521 based position to a sub-picture 522 based position.

Accordingly, a decoder can read the sub-bitstream 501 and obtain the ID flag 531 to determine that slices 524 are addressed by defined addresses instead of indices. The decoder can obtain the IDs 532 to determine the sub-picture 522 included in the sub-bitstream 501. The decoder can also obtain the slice address(es) 534 and the length of slice address 533 to interpret the slice address(es) 534. The decoder can then obtain the mapping 535 to map the slice address(es) 534 to a format that the decoder can interpret. The decoder can then employ the slice address(es) 534 when decoding and displaying the sub-picture 522 and corresponding slices 524.

Figure 6:
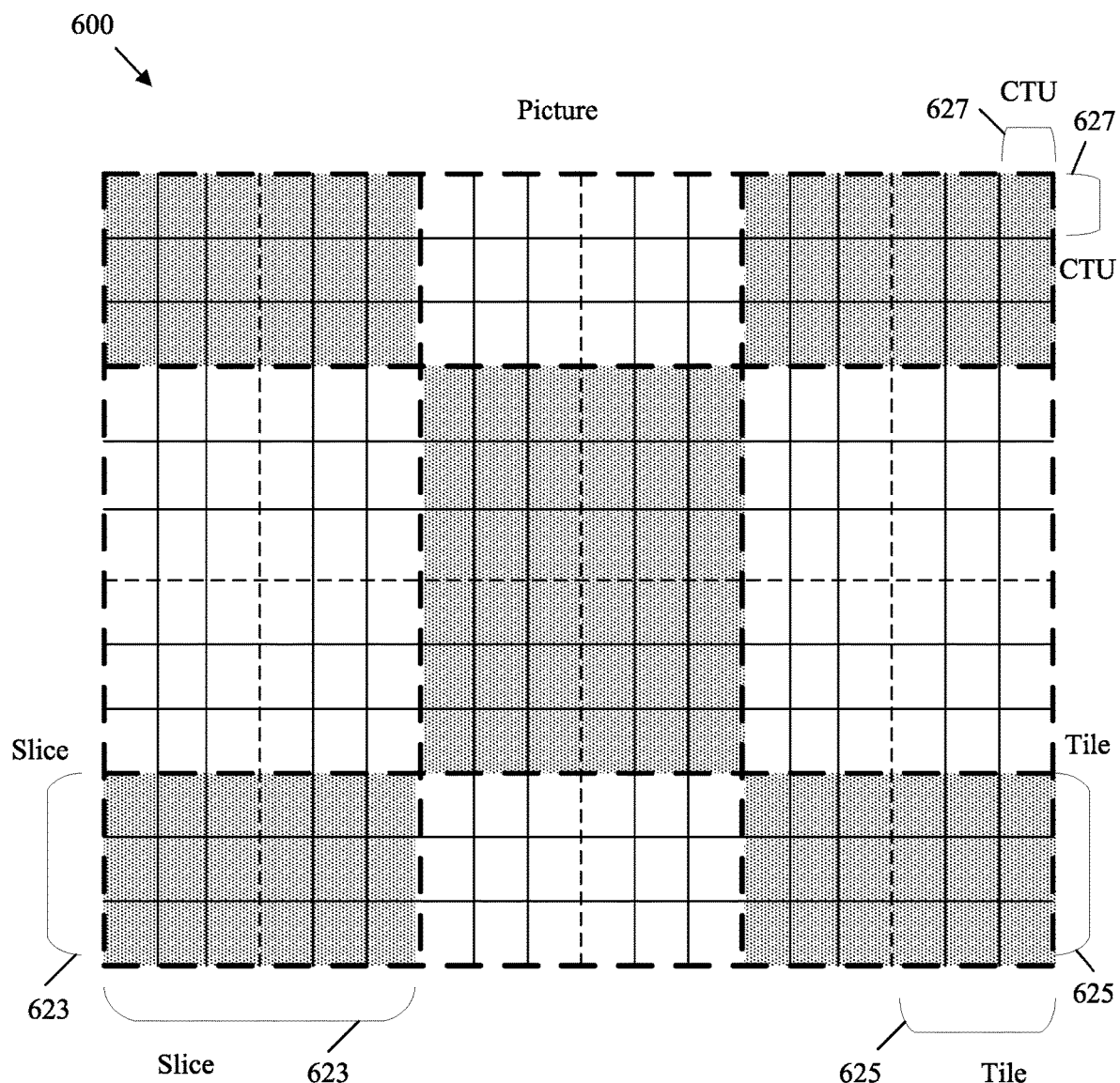
FIG. 6 is a schematic diagram illustrating an example picture partitioned for coding.

FIG. 6 is a schematic diagram illustrating an example picture 600 partitioned for coding. For example, a picture 600 can be encoded in and decoded from a bitstream 500, for example by a codec system 200, an encoder 300, and/or a decoder 400. Further, the picture 600 can be partitioned and/or included in sub-pictures in a sub-bitstream 501 to support encoding and decoding according to method 100.

The picture 600 can be partitioned into slices 623, which may be substantially similar to slice 523. The slices 623 may be further partitioned into tiles 625 and CTUs 627. In FIG. 6, the slices 623 are depicted by bold lines with alternative white backgrounds and hashing to graphically differentiate between slices 623. The tiles 625 are shown by dashed lines. Tile 625 boundaries positioned on slice 623 boundaries are depicted as dashed bold lines and tile 625 boundaries that are not positioned on slice 623 boundaries are depicted as non-bold dashed lines. The CTU 627 boundaries are depicted as solid non-bold lines except for locations where the CTU 627 boundaries are covered by tile 625 or slice 623 boundaries. In this example, picture 600 includes nine slices 623, twenty four tiles 625, and two hundred sixteen CTUs 627.

As shown, a slice 623 is a rectangle with boundaries that may be defined by the included tiles 625 and/or CTUs 627. The slice 623 may not extend across the entire width of the picture 600. Tiles 625 can be generated in the slices 623 according to rows and columns. CTUs 627 can be partitioned from the tiles 625 and/or slices 623 to create picture 600 partitions suitable to be subdivided into coding blocks for coding according to inter-prediction and/or intra-prediction. The picture 600 may be encoded into a bitstream, such as bitstream 500. Regions of the picture 600 may be included in a sub-picture and extracted into a sub-bitstream, such as sub-picture 522 and sub-bitstream 501, respectively.

Figure 7:
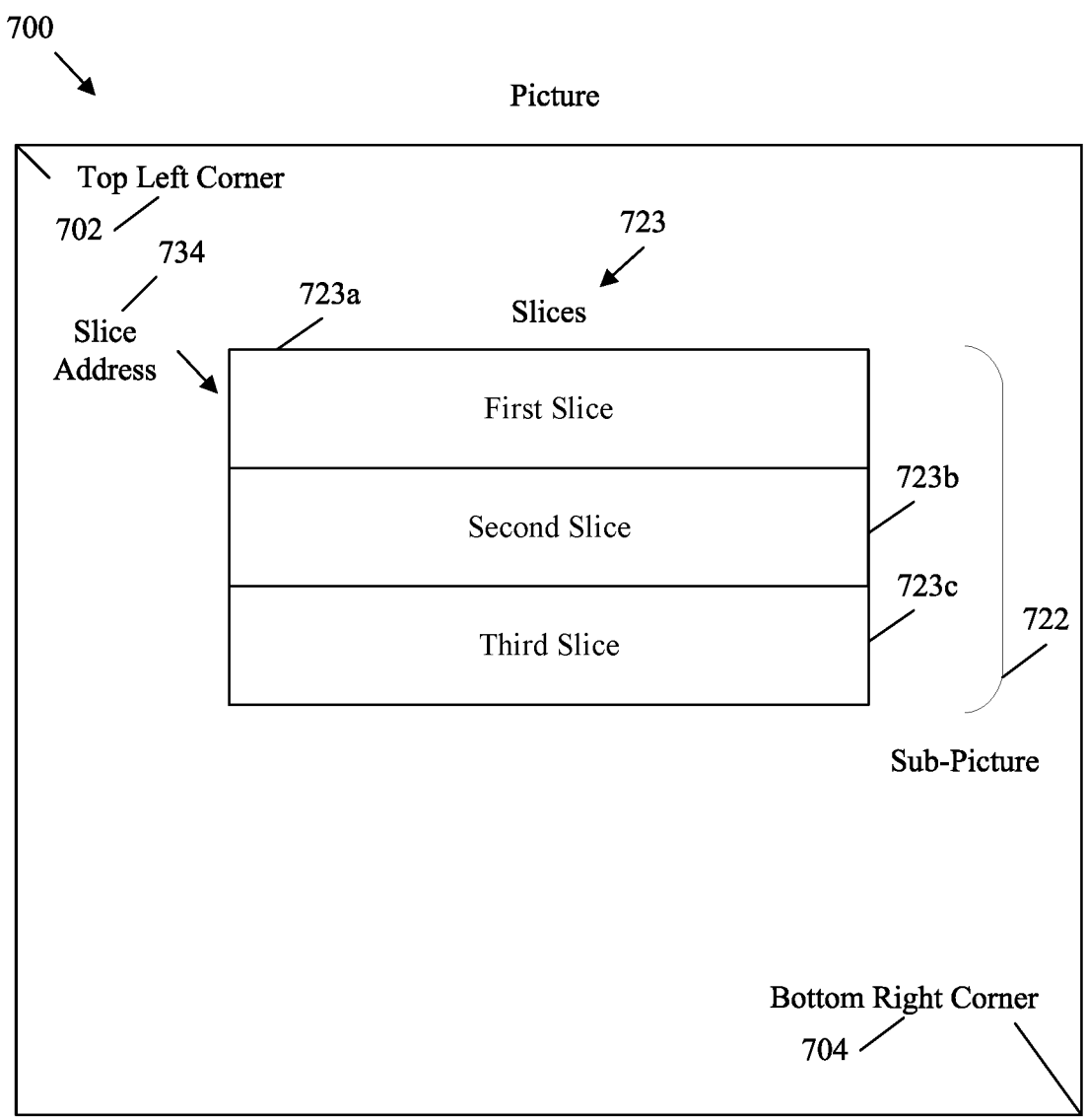
FIG. 7 is a schematic diagram illustrating an example sub-picture extracted from a picture.

FIG. 7 is a schematic diagram illustrating an example sub-picture 722 extracted from a picture 700. For example, the picture 700 may be substantially similar to picture 600. Further, picture 700 can be encoded into a bitstream 500, for example by a codec system 200, and/or an encoder 300. The sub-picture 722 can be extracted into and decoded from a sub-bitstream 501, for example by a codec system 200, an encoder 300, and/or a decoder 400. Further, the picture 700 can be employed to support encoding and decoding according to method 100.

As shown, the picture 700 includes a top left corner 702 and a bottom right corner 704. A sub-picture 722 contains one or more slices 723 from the picture 700. When using indexes, the top left corner 702 and bottom right corner 704 are associated with the first and last index, respectively. However, a decoder may only display the sub-picture 722 and not the entire picture 700. Further, a slice address 734 of a first slice 723a may not align with the top left corner 702 and a slice address 734 of a third slice 723c may not align with the bottom right corner 704. As such, slice addresses 734 relative to the sub-picture 722 do not align with the slice addresses 734 relative to the picture 700. The present disclosure employs defined IDs for the slice addresses 734 instead of indices. The decoder can employ a mapping to map the slice addresses 734 from a picture 700 based position to a sub-picture 722 based position. The decoder can then employ the mapped slice addresses 734 to place the first slice 723a at the top left corner 702 of the decoder display, to place the third slice 723c at the bottom left corner 704 of the decoder display, and to place the second slice 723b between the first slice 723a and the third slice 723c.

As described herein, the present disclosure describes improvements for explicit tile ID signaling in video coding where tiles are used for picture partitioning. The description of the techniques are based on VVC by the JVET of ITU-T and ISO/IEC. However, the techniques also apply to other video codec specifications. The following are example embodiments described herein.

The concept of tile indices and tile IDs can be differentiated. The tile ID of a tile may or may not be equal to the tile index of the tile. When the tile ID is different from the tile index, a mapping between the tile ID and the tile index may be signaled in the PPS. A tile ID may be used for signaling of tile group addresses in tile group headers instead of using the tile index. In this way, the value of the tile ID can be kept the same when the tile group is extracted from and original bitstream. This may be accomplished by updating the mapping between the tile ID and the tile index in the PPS referred to by the tile group. This approach addresses cases where the value of the tile index may change depending on the sub-picture to be extracted. It should be noted that other parameter sets (e.g., other than the slice header) may still be rewritten when performing MCTS based sub-bitstream extraction.

The forgoing may be accomplished by employing a flag in a parameter set where tile information is signaled. For example, a PPS can be employed as the parameter set. For example, an explicit_tile_id_flag may be employed for this purpose. The explicit_tile_id_flag may be signaled regardless of the number of tiles in a picture, and may indicate that explicit tile signaling is used. A syntax element may also be employed to specify a number of bits for signaling of tile ID value (e.g., the mapping between the tile index and the tile ID). Such a syntax element may also be employed for signaling the tile ID/address in tile group header. For example, a tile_id_len_minus1 syntax element may be employed for this purpose. The tile_id_len_minus1 may not be present when explicit_tile_id_flag is equal to zero (e.g., when the tile ID is set equal to tile index). When tile_id_len_minus1 is not present, the value of tile_id_len_minus1 may be inferred to be equal to the value of Ceil (Log 2(NumTilesInPic). A further constraint may require that a bitstream that is a result of an MCTS sub-bitstream extraction may include an explicit_tile_id_flag set equal to one for active PPSs unless the sub-bitstream contains the upper-left corner tile in the original bitstream.

In an example embodiment, the video coding syntax may be modified as described below to achieve the functionality described herein. An example CTB raster and tile scanning process may be described as follows. The list TileId[ctbAddrTs] for ctbAddrTs ranging from 0 to PicSizeInCtbsY−1, inclusive, specifying the conversion from a CTB address in tile scan to a tile ID, and the list NumCtusInTile[tileIdx] for tileIdx ranging from 0 to PicSizeInCtbsY−1, inclusive, specifying the conversion from a tile index to the number of CTUs in the tile, are derived as follows:

```
for( j = 0, tileIdx = 0; j <= num_tile_rows_minus1; j++ )
  for( i = 0; i <= num_tile_columns_minus1; i++, tileIdx++ ) {
    for( y = RowBd[ j ]; y < RowBd[ j + 1 ]; y++ )          (6-7)
    for( x = ColBd [ i ]; x < ColBd[ i + 1 ]; x++ )
      TileId[ CtbAddrRsToTs[ y * PicWidthInCtbsY+ x ] ] =
        explicit_tile_id_flag ? tile_id_val[ tileIdx ] : tileIdx
    FirstCtbAddrTs[ tileIdx ] =
CtbAddrRsToTs[ RowBd[ j ] * PicWidthInCtbsY + ColBd[ i ] ]
}
```

The list NumCtusInTile[tileIdx] for tileIdx ranging from 0 to PicSizeInCtbsY−1, inclusive, specifying the conversion from a tile index to the number of CTUs in the tile may be derived as follows:

for($j$=0,tileIdx=0;$j$<=num_tile_rows_minus1;$j$++)

for($i$=0;$i$<=num_tile_columns_minus1;$i$++,tileIdx++)

NumCtusInTile[tileIdx]=ColWidth[$i$]*RowHeight[$j$]    (6-8)

The set TileIdToIdx[tileId] for a set of NumTilesInPic tileId values specifying the conversion from a tile ID to a tile index may be derived as follows:

```
for( ctbAddrTs = 0, tileIdx = 0, tileStartFlag = 1; ctbAddrTs < PicSizeInCtbsY;
ctbAddrTs++ ) {
    if( tileStartFlag ) {
      TileIdToIdx[ TileId[ ctbAddrTs ] ] = tileIdx                    (6-9)
      tileStartFlag = 0
    }
    tileEndFlag = ctbAddrTs = = PicSizeInCtbsY − 1 || TileId[ ctbAddrTs + 1 ]
!= TileId[ ctbAddrTs ]
```

```
    if( tileEndFlag ) {
       tileIdx++
       tileStartFlag = 1
    }
  }
}
```

An example Picture parameter set RBSP syntax may be described as follows.

| pic_parameter_set_rbsp( ) { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     loop_filter_across_tiles_enabled_flag | u(1) |
|   } | |
|   explicit_tile_id_flag | u(1) |
|   if( explicit_tile_id_flag ) { | |
|     tile_id_len_minus1 | ue(v) |
|     for( i = 0; i < NumTilesInPic; i++ ) | |
|       tile_id_val[ i ] | u(v) |
|   } | |
|   rbsp_trailing_bits( ) | |
| } | |

An example tile group header syntax may be described as follows.

| tile_group_header( ) { | Descriptor |
|---|---|
|   tile_group_pic_parameter_set_id | ue(v) |
|   tile_group_address | u(v) |
|   if( NumTilesInPic > 1 ) | |
|     num_tiles_in_tile_group_minus1 | ue(v) |
|   ... | |

An example tile group data syntax may be described as follows.

| tile_group_data( ) { | Descriptor |
|---|---|
|   tileIdx = TileIdToIdx[ tile_group_address ] | |
|   for( i = 0; i <= num_tiles_in_tile_group_minus1; i++, | |
|   tileIdx++ ) { | |
|     ctbAddrInTs = FirstCtbAddrTs[ tileIdx ] | |
|     for( j = 0; j < NumCtusInTile[ tileIdx ]; j++, | |
|     ctbAddrInTs++ ) { | |
|       CtbAddrInRs = CtbAddrTsToRs[ ctbAddrInTs ] | |
|       coding_tree_unit( ) | |
|     } | |
|     end_of_tile_one_bit /* equal to 1 */ | ae(v) |
|     if( i < num_tiles_in_tile_group_minus1 ) | |
|       byte_alignment( ) | |
|   } | |
| } | |

An example picture parameter set RBSP semantics may be described as follows. An explicit_tile_id_flag set equal to one specifies that the tile ID for each tile is explicitliy signaled. An explicit_tile_id_flag set equal to zero specifies that tile IDs are not explicitly signaled. For a bitstream that is a result of an MCTS sub-bitstream extraction, the value of explicit_tile_id_flag may be set equal to one for active PPSs unless the resulting bitstream contains the upper-left corner tile in the original bitstream. A tile_id_len_minus1 plus 1 specifies the number of bits used to represent the syntax element tile_id_val[i] and the syntax element tile_group_address in tile group headers referring to the PPS. The value of tile_id_len_minus1 may be in the range of Ceil(Log 2(NumTilesInPic) to fifteen, inclusive. When not present, the value of tile_id_len_minus1 may be inferred to be equal to Ceil (Log 2(NumTilesInPic). It should be noted that the value of tile_id_len_minus1 may be greater than Ceil(Log 2(NumTilesInPic) in some cases. This is because the current bitstream may be the result of an MCTS sub-bitstream extraction. In that case, the tile IDs, which can be the tile indices in the original bitstream, may be represented by Ceil(Log 2(OrgNumTilesInPic) bits, where OrgNumTilesInPic is the NumTilesInPic of the original bitstream, which is greater than NumTilesInPic of the current bitstream. The tile_id_val[i] specifies the tile ID of the i-th tile of pictures referring to the PPS. The length of tile_id_val[i] is tile_id_len_minus1+1 bits. For any integers m and n in the range of 0 to NumTilesInPic−1, inclusive, tile_id_val[m] may not be equal to tile_id_val[n] when m is not equal to n, and tile_id_val[m] may be less than tile_id_val[n] when m is less than n.

The following variables may be derived by invoking the CTB raster and tile scanning conversion: the list ColWidth[i] for i ranging from 0 to num_tile_columns_minus1, inclusive, specifying the width of the i-th tile column in units of CTBs; the list RowHeight[j] for j ranging from 0 to num_tile_rows_minus1, inclusive, specifying the height of the j-th tile row in units of CTBs; the list ColBd[i] for i ranging from 0 to num_tile_columns_minus1+1, inclusive, specifying the location of the i-th tile column boundary in units of CTBs; the list RowBd[j] for j ranging from 0 to num_tile_rows_minus1+1, inclusive, specifying the location of the j-th tile row boundary in units of CTBs; the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan; the list CtbAddrTsToRs[ctbAddrTs] for ctbAddrTs ranging from 0 to PicSizeInCtbsY−1, inclusive, specifying the conversion from a CTB address in the tile scan to a CTB address in the CTB raster scan of a picture; the list TileId[ctbAddrTs] for ctbAddrTs ranging from 0 to PicSizeInCtbsY−1, inclusive, specifying the conversion from a CTB address in tile scan to a tile ID; the list NumCtusInTile[tileIdx] for tileIdx ranging from 0 to PicSizeInCtbsY−1, inclusive, specifying the conversion from a tile index to the number of CTUs in the tile; the list FirstCtbAddrTs[tileIdx] for tileIdx ranging from 0 to NumTilesInPic−1, inclusive, specifying the conversion from a tile ID to the CTB address in tile scan of the first CTB in the tile; the set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile; the lists ColumnWidthInLumaSamples[i] for i ranging from 0 to num_tile_columns_minus1, inclusive, specifying the width of the i-th tile column in units of luma samples; and the list RowHeightInLumaSamples[j] for j ranging from 0 to num_tile_rows_minus1, inclusive, specifying the height of the j-th tile row in units of luma samples.

A tile_group_address specifies the tile ID of the first tile in the tile group. The length of tile_group_address is tile_id_len_minus1+1 bits. The value of tile_group_address may be in the range of zero to 2tile_id_len_minus1+1−1 inclusive, and the value of tile_group_address may not be equal to the value of tile_group_address of any other coded tile group NAL unit of the same coded picture.

Figure 8:
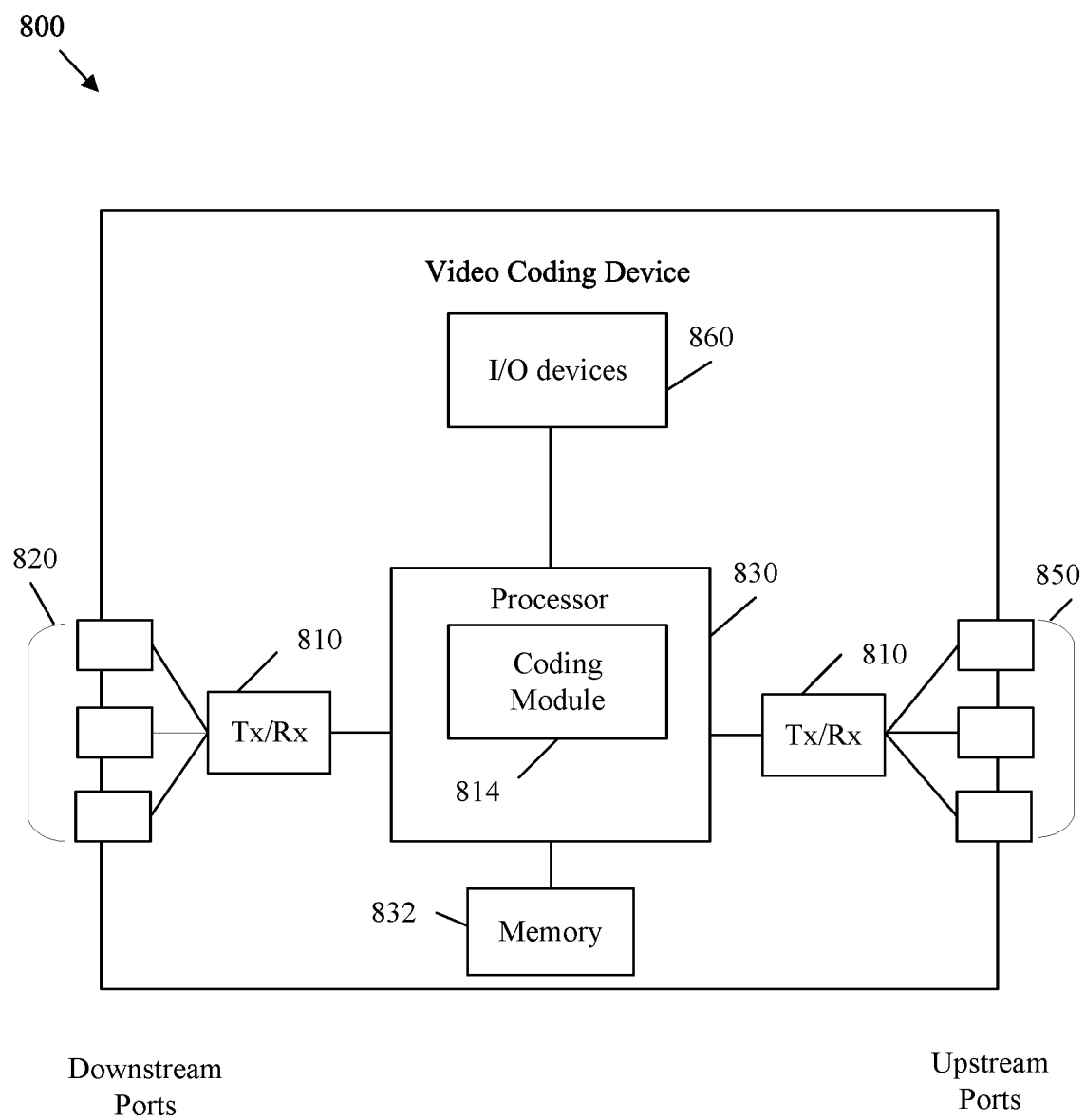
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described above, such as methods 100, 900, and 1000, which may employ a bitstream 500, a picture 600, and/or a picture 700. The coding module 814 may also implement any other method/mechanism described herein. Further, the coding module 814 may implement a codec system 200, an encoder 300, and/or a decoder 400. For example, when acting as an encoder, the coding module 814 can specify a flag, a sub-picture ID, and a length in a PPS. The coding module 814 can also encode a slice address in a slice header. The coding module 814 can then extract a sub-bitstream of sub-pictures from a bitstream of pictures without rewriting the slice headers. When acting as a decoder, the coding module 814 can read the flag to determine if an explicit slice address is used instead of an index. The coding module 814 can also read the length and sub-picture ID from the PPS and the slice address from the slice header. The coding module 814 can then interpret the slice address using the length and use the sub-picture ID to map the slice address from a picture based address to a sub-picture based address. As such, the coding module 814 can determine the desired position of the slices regardless of the sub-picture selected and without requiring that the slice header be rewritten to accommodate sub-picture based address changes. As such, the coding module 814 causes the video coding device 800 to provide additional functionality, avoid certain processing to reduce processing overhead, and/or increase coding efficiency when partitioning and coding video data. Accordingly, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

Figure 9:
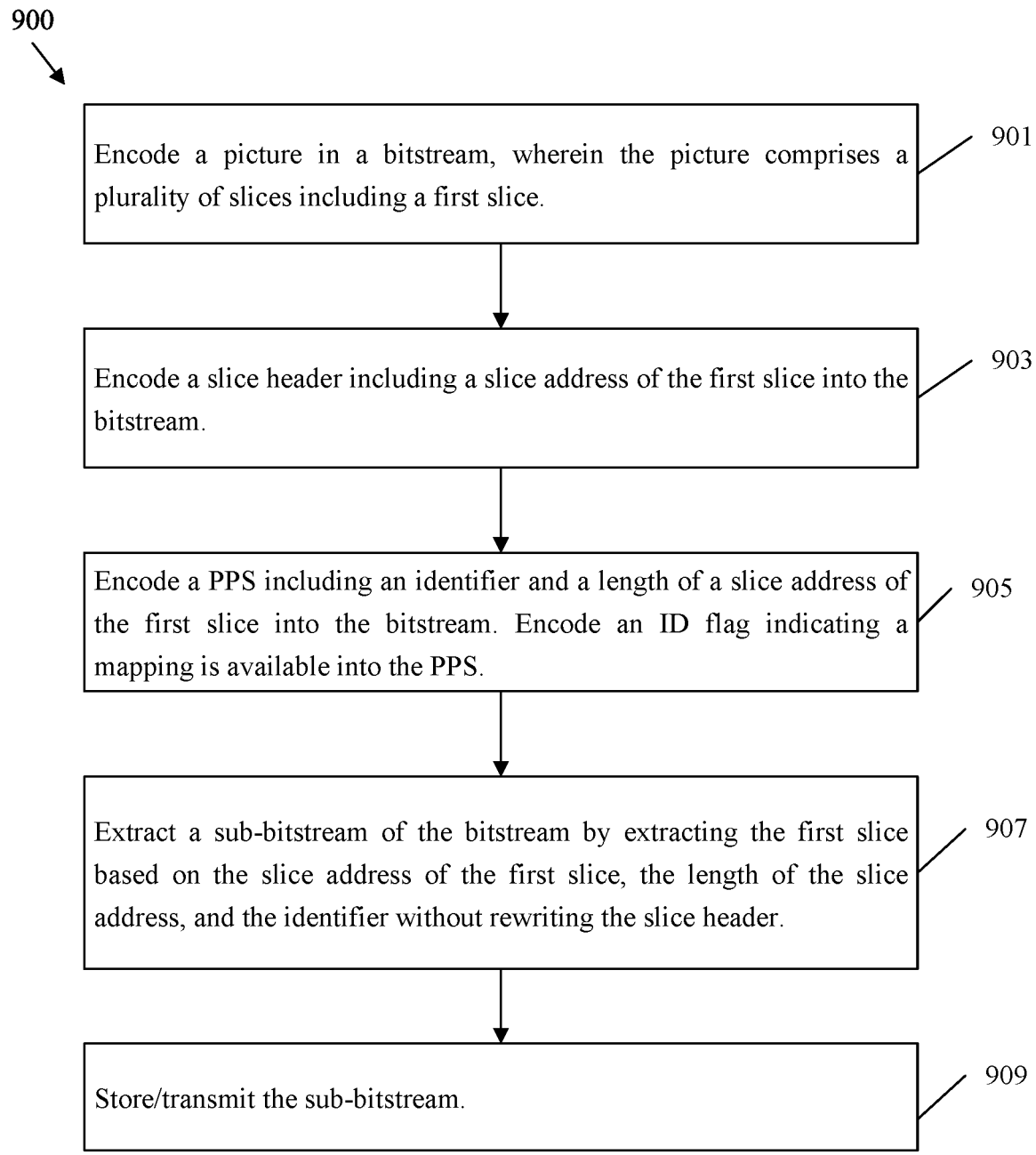
FIG. 9 is a flowchart of an example method of encoding a bitstream of pictures to support extraction of a sub-bitstream of sub-pictures without rewriting a slice header by employing explicit address signaling.

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution FIG. 9 is a flowchart of an example method 900 of encoding a bitstream of pictures, such as bitstream 500 and picture 600, respectively, to support extraction of a sub-bitstream of sub-pictures, such as sub-bitstream 501 and sub-picture 522, respectively, without rewriting a slice header by employing explicit address signaling. Method 900 may be employed by an encoder, such as a codec system 200, an encoder 300, and/or a video coding device 800 when performing method 100.

Method 900 may begin when an encoder receives a video sequence including a plurality of pictures and determines to encode that video sequence into a bitstream, for example based on user input. The video sequence is partitioned into pictures/images/frames for further partitioning prior to encoding. At step 901, a picture of the video sequence is encoded in a bitstream. The picture may include a plurality of slices including a first slice. The first slice may be any slice in the picture, but is described as the first slice for clarity of discussion. As an example, the top left corner of the first slice may not align with the top left corner of the picture.

At step 903, a slice header associated with the slice is encoded into the bitstream. The slice header includes a slice address of the first slice. The slice address may comprise a defined value, such as a numerical value selected by the encoder. Such a value may be arbitrary, but may increase in raster scan order (e.g., left to right and top to bottom) in order to support consistent coding functionality. The slice address may not comprise an index. In some examples, the slice address may be a slice_address syntax element.

At step 905, a PPS is encoded in the bitstream. An identifier and a length of a slice address of the first slice may be encoded into the PPS in the bitstream. The identifier may be a sub-picture identifier. The length of the slice address may indicate a number of bits contained in the slice address. For example, the length of the slice address in the PPS may contain data sufficient to interpret the slice address from the slice header as coded in step 903. In some examples, the length may be a subpic_id_len_minus1 syntax element. Further, the identifier may contain data sufficient to map the slice address from a picture based position to a sub-picture based position. In some examples, the identifier may be a subPicIdx syntax element. For example, a plurality of sub-picture based identifiers may be included in the PPS. When a sub-picture is extracted, the corresponding sub-picture ID may be indicated in the PPS, for example by employing a flag/pointer and/or removing the unused sub-picture IDs. In some examples, an explicit ID flag may also be coded into a parameter set. The flag may indicate to the decoder that a mapping is available to map the slice address from the picture based position to the sub-picture based position. In some examples, the mapping may be a SliceSubpicToPicIdx [SubPicIdx][slice_address] syntax element. Accordingly, the flag may indicate that the slice address in not an index. In some examples, the flag may be a sps_subpic_id_present_flag.

At step 907, a sub-bitstream of the bitstream is extracted. For example, this may include extracting the first slice based on the slice address of the first slice, the length of the slice address, and the identifier without rewriting the slice header. As a particular example, such extracting may also include extracting a sub-picture of the picture. In this case, the sub-picture includes the first slice. The parameter sets may also be included into the sub-bitstreams. For example, the sub-bitstream may comprise the sub-picture, the slice header, the PPS, an SPS, etc.

At step 909, the sub-bitstream is stored for communication toward a decoder. The sub-bitstream may then be transmitted toward the decoder as desired.

Figure 10:
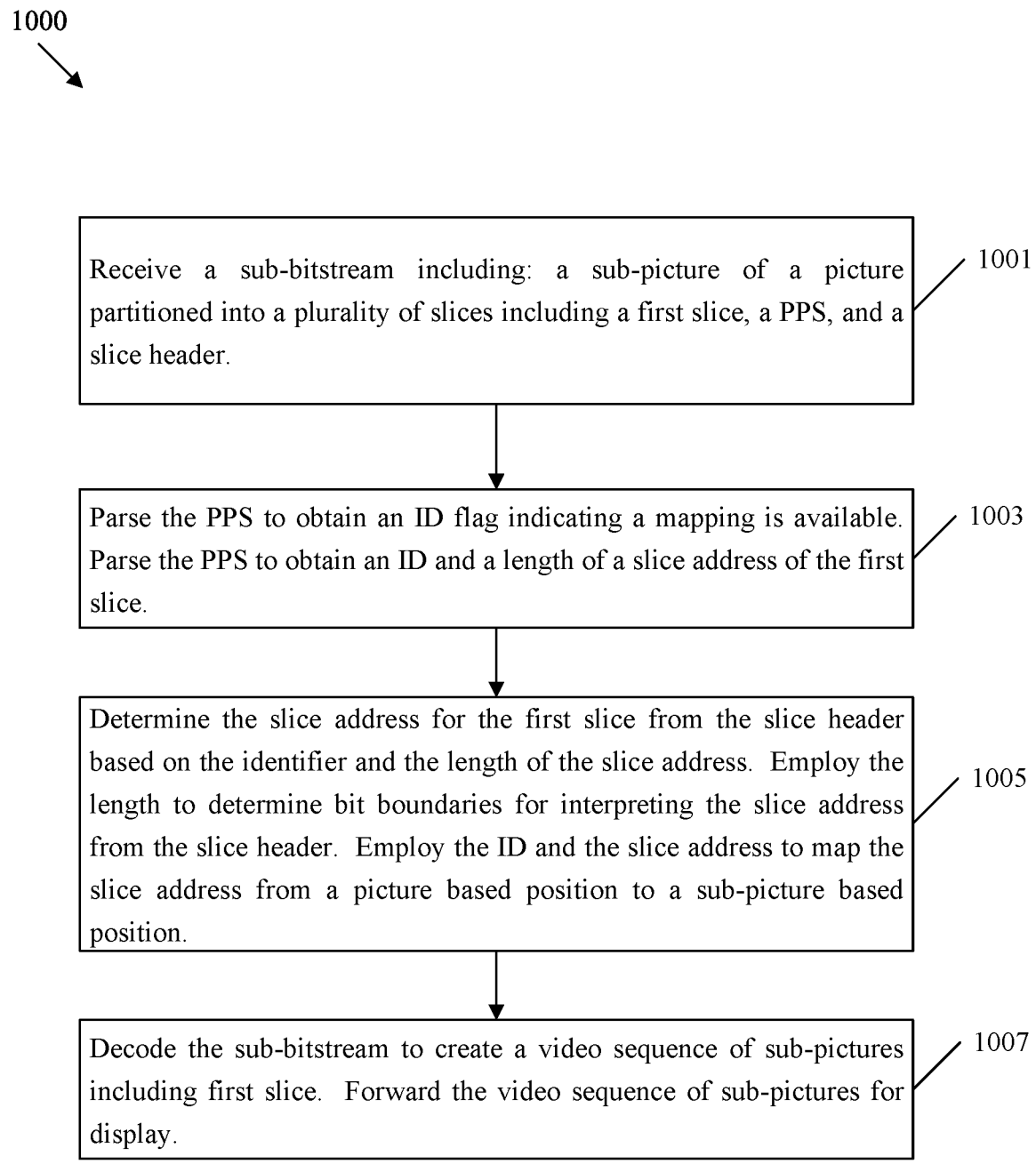
FIG. 10 is a flowchart of an example method of decoding a sub-bitstream of sub-pictures by employing explicit address signaling.

FIG. 10 is a flowchart of an example method 1000 of decoding a sub-bitstream of sub-pictures, such as sub-bitstream 501 and sub-picture 522, extracted from a bitstream of pictures, such as bitstream 500 and picture 600, by employing explicit address signaling. Method 1000 may be employed by a decoder, such as a codec system 200, a decoder 400, and/or a video coding device 800 when performing method 100.

Method 1000 may begin when a decoder begins receiving a sub-bitstream extracted from a bitstream, for example as a result of method 900. At step 1001, the sub-bitstream is received. The sub-bitstream includes a sub-picture of a picture. For example, a bitstream encoded at an encoder may include pictures, the sub-bitstream is extracted from the bitstream at the encoder and/or a slicer, and the sub-bitstream includes sub-pictures containing one or more regions from the pictures in the bitstreams. A received sub-picture may be partitioned into a plurality of slices. The plurality of slices may include a slice designated as a first slice. The first slice may be any slice in the picture, but is described as the first slice for clarity of discussion. As an example, the top left corner of the first slice may not align with the top left corner of the picture. The sub-bitstream also includes a PPS that describes syntax associated with the picture, and hence also describes syntax associated with the sub-picture. The sub-bitstream also includes a slice header that describes syntax associated with the first slice.

At step 1003, a parameter set, such as the PPS and/or SPS, may be parsed to obtain an explicit ID flag. The ID flag may indicate a mapping is available to map a slice address from a picture based position to a sub-picture based position. Accordingly, the flag may indicate that the corresponding slice address comprises a defined value and does not comprise an index. In some examples, the flag may be a sps_subpic_id_present_flag. Based on the value of the ID flag, the PPS can be parsed to obtain an identifier and a length of a slice address of the first slice. The identifier may be a sub-picture identifier. The length of the slice address may indicate a number of bits contained in a corresponding slice address. For example, the length of the slice address in the PPS may contain data sufficient to interpret a slice address from the slice header. In some examples, the length may be a subpic_id_len_minus1 syntax element. Further, the identifier may contain data sufficient to map the slice address from a picture based position to a sub-picture based position. In some examples, the identifier may be a subPicIdx syntax element. For example, a plurality of sub-picture based identifiers may be included in the PPS. When a sub-picture is extracted, the corresponding sub-picture ID may be indicated in the PPS, for example by employing a flag/pointer and/or removing the unused sub-picture IDs.

At step 1005, the slice address for the first slice is determined from the slice header based on the identifier and the length of the slice address. For example, the length from the PPS can be employed to determine bit boundaries for interpreting the slice address from the slice header. The identifier and the slice address can then be employed to map the slice address from a picture based position to a sub-picture based position. As an example, the mapping between the picture based position and the sub-picture based position may be used to align the slice header to the sub-picture. This allows the decoder to compensate for address mismatches between the slice header and the picture addressing scheme caused by sub-bitstream extraction without requiring that the slice header be rewritten at the encoder and/or slicer. In some examples, the mapping may be a SliceSubpicToPicIdx [SubPicIdx] [slice_address] syntax element.

At step 1007, the sub-bitstream can be decoded to create a video sequence of sub-pictures. The may sub-pictures include the first slice. Accordingly, the first slice is also decoded. The video sequence of sub-pictures, including the decoded first slice, can then be forwarded for display, for example via a head mounted display or other display device.

Figure 11:
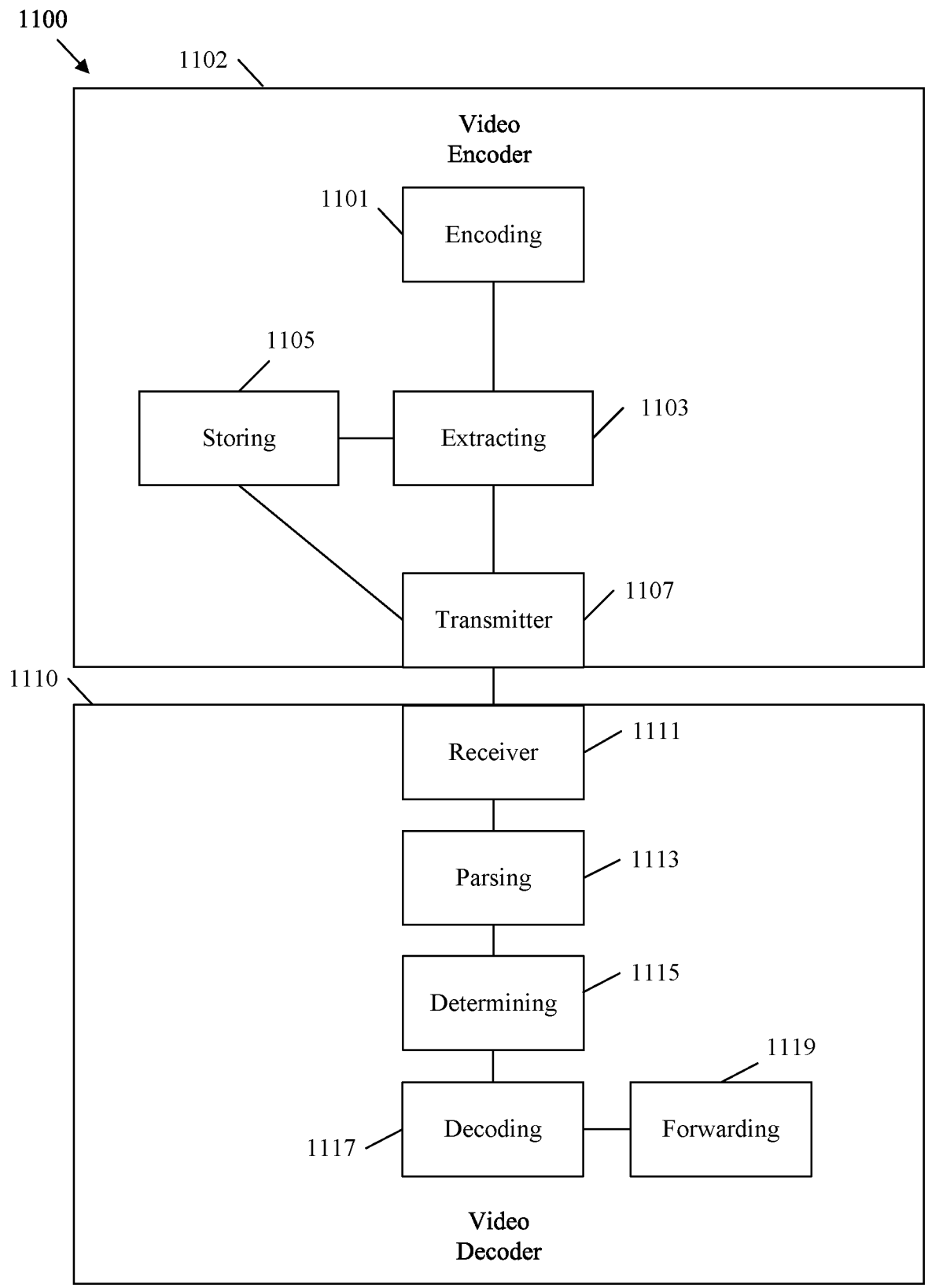
FIG. 11 is a schematic diagram of an example system for transmitting a sub-bitstream of sub-pictures by employing explicit address signaling.

FIG. 11 is a schematic diagram of an example system 1100 for transmitting a sub-bitstream of sub-pictures, such as sub-bitstream 501 and sub-picture 522, extracted from a bitstream of pictures, such as bitstream 500 and picture 600, by employing explicit address signaling. System 1100 may be implemented by an encoder and a decoder such as a codec system 200, an encoder 300, a decoder 400, and/or a video coding device 800. Further, system 1100 may be employed when implementing method 100, 900, and/or 1000.

The system 1100 includes a video encoder 1102. The video encoder 1102 comprises an encoding module 1101 for encoding a picture in a bitstream, wherein the picture comprises a plurality of slices including a first slice; encoding in the bitstream a slice header including a slice address of the first slice; and encoding in the bitstream a PPS including an identifier and a length of a slice address of the first slice. The video encoder 1102 further comprises an extracting module 1103 for extracting a sub-bitstream of the bitstream by extracting the first slice based on the slice address of the first slice, the length of the slice address, and the identifier without rewriting the slice header. The video encoder 1102 further comprises a storing module 1105 for storing the sub-bitstream for communication toward a decoder. The video encoder 1102 further comprises a transmitting module 1107 for transmitting the sub-bitstream including the slice header, the PPS, the first slice, and/or a corresponding sub-picture toward the decoder. The video encoder 1102 may be further configured to perform any of the steps of method 900.

The system 1100 also includes a video decoder 1110. The video decoder 1110 comprises a receiving module 1111 for receiving a sub-bitstream including: a sub-picture of a picture partitioned into a plurality of slices including a first slice, a PPS associated with the picture and the sub-picture, and a slice header associated with the first slice. The video decoder 1110 further comprises a parsing module 1113 for parsing the PPS to obtain an identifier and a length of a slice address of the first slice. The video decoder 1110 further comprises a determining module 1115 for determining the slice address for the first slice from the slice header based on the identifier and the length of the slice address. The video decoder 1110 further comprises a decoding module 1117 for decoding the sub-bitstream to create a video sequence of sub-pictures including the first slice. The video decoder 1110 further comprises a forwarding module 1119 for forwarding the video sequence of sub-pictures for display. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
    receiving a sub-bitstream including: a sub-picture of a picture partitioned into a plurality of slices including a first slice, a parameter set associated with the picture and the sub-picture, and a slice header associated with the first slice;
    parsing the parameter set to obtain an identifier and a length of a slice address of the first slice;
    determining the slice address for the first slice from the slice header based on the identifier and the length of the slice address, wherein determining the slice address for the first slice comprises:
        employing the length from the parameter set to determine bit boundaries for interpreting the slice address from the slice header; and
        employing the identifier and the slice address to map slice addresses between a picture based position and a sub-picture based position;
    decoding the sub-bitstream to create a video sequence of sub-pictures including the first slice; and
    forwarding the video sequence of the sub-pictures for display.

2. The method of claim 1, wherein the identifier is associated with a the sub-picture.

3. The method of claim 1, wherein the length of the slice address indicates a number of bits contained in the slice address.

4. The method of claim 1, further comprising parsing the parameter set to obtain a flag, wherein the flag indicates a mapping is available to map the slice address from the picture based position to the sub-picture based position.

5. The method of claim 4, wherein the mapping between the picture based position and the sub-picture based position aligns the slice header to the sub-picture without requiring that the slice header be rewritten.

6. A method implemented by an encoder, the method comprising:
    encoding a picture in a bitstream, wherein the picture comprises a plurality of slices including a first slice;
    encoding in the bitstream a slice header including a slice address of the first slice;
    encoding in the bitstream a parameter set including an identifier and a length of the slice address of the first slice, wherein the length in the parameter set contains data sufficient to interpret the slice address from the slice header, and wherein the identifier contains data sufficient to map slice addresses between a sub-picture based position and a picture based position;
    extracting a sub-bitstream of the bitstream by extracting the first slice based on the slice address of the first slice, the length of the slice address, and the identifier without rewriting the slice header; and
    storing the sub-bitstream for communication toward a decoder.

7. The method of claim 6, wherein the identifier is associated with a sub-picture.

8. The method of claim 6, wherein the length of the slice address indicates a number of bits contained in the slice address.

9. The method of claim 6, further comprising encoding in a the parameter set a flag indicating a mapping is available to map the slice address from the picture based position to the sub-picture based position.

10. The method of claim 6, wherein extracting the sub-bitstream of the bitstream includes extracting a sub-picture of the picture, the sub-picture including the first slice, and wherein the sub-bitstream comprises the sub-picture, the slice header, and the parameter set.

11. A video coding device comprising:
    a receiver configured to receive a sub-bitstream including: a sub-picture of a picture partitioned into a plurality of slices including a first slice, a parameter set associated with the picture and the sub-picture, and a slice header associated with the first slice; and
    a processor configured to:
        parse the parameter set to obtain an identifier and a length of a slice address of the first slice;

determine the slice address for the first slice from the slice header based on the identifier and the length of the slice address, wherein determining the slice address for the first slice comprises:
employing the length from the parameter set to determine bit boundaries for interpreting the slice address from the slice header; and
employing the identifier and the slice address to map slice addresses between a sub-picture based position and a picture based position;
decode the sub-bitstream to create a video sequence of sub-pictures including the first slice; and
forward the video sequence of the sub-pictures for display.

12. The video coding device of claim 11, wherein the identifier is associated with a the sub-picture.

13. The video coding device of claim 11, wherein the length of the slice address indicates a number of bits contained in the slice address.

14. The video coding device of claim 11, wherein the processor is further configured to parse the parameter set to obtain a flag, wherein the flag indicates a mapping is available to map the slice address from the picture based position to the sub-picture based position.

15. The video coding device of claim 14, wherein the mapping between the picture based position and the sub-picture based position aligns the slice header to the sub-picture without requiring that the slice header be rewritten.

* * * * *

UNITED STATES PATENT AND TRADEMARK OFFICE
CERTIFICATE OF CORRECTION

PATENT NO. : 11,729,384 B2
APPLICATION NO. : 17/362279
DATED : August 15, 2023
INVENTOR(S) : FNU Hendry et al.

It is certified that error appears in the above-identified patent and that said Letters Patent is hereby corrected as shown below:

In the Claims

Column 32, Lines 11-12, Claim 2, should read:
2. The method of claim 1, wherein the identifier is associated with the sub-picture.

Column 32, Lines 50-53, Claim 9, should read:
9. The method of claim 6, further comprising encoding in the parameter set a flag indicating a mapping is available to map the slice address from the picture based position to the sub-picture based position.

Column 33, Lines 15-16, Claim 12, should read:
12. The video coding device of claim 11, wherein the identifier is associated with the sub-picture.

Signed and Sealed this
Seventeenth Day of October, 2023

Katherine Kelly Vidal
*Director of the United States Patent and Trademark Office*